United States Patent
Maletsky et al.

(10) Patent No.: US 9,182,802 B2
(45) Date of Patent: *Nov. 10, 2015

(54) SINGLE PIN COMMUNICATION MECHANISM

(71) Applicant: Atmel Corporation, San Jose, CA (US)

(72) Inventors: Kerry David Maletsky, Monument, CO (US); David Durant, Colorado Springs, CO (US); John Landreman, Colorado Springs, CO (US); Balaji Badam, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 14/060,466

(22) Filed: Oct. 22, 2013

(65) Prior Publication Data

US 2014/0047250 A1   Feb. 13, 2014

Related U.S. Application Data

(63) Continuation of application No. 12/395,449, filed on Feb. 27, 2009, now Pat. No. 8,677,145.

(51) Int. Cl.
*G06F 21/00* (2013.01)
*G06F 1/32* (2006.01)
*H01M 10/42* (2006.01)
*H02J 7/00* (2006.01)
*H01M 10/0525* (2010.01)

(52) U.S. Cl.
CPC ........... *G06F 1/324* (2013.01); *H01M 10/4257* (2013.01); *H01M 10/0525* (2013.01); *H02J 2007/0001* (2013.01)

(58) Field of Classification Search
CPC .............. G06F 1/324; H01M 10/4257; H01M 10/0525; H02J 2007/0001
USPC ........ 713/189; 726/35, 36; 320/106; 714/799
See application file for complete search history.

(56) References Cited

U.S. PATENT DOCUMENTS

| | | | |
|---|---|---|---|
| 4,539,992 | A | 9/1985 | Calfee et al. |
| 4,751,498 | A | 6/1988 | Shalvi et al. |
| 5,161,190 | A | 11/1992 | Cairns |
| 5,412,644 | A | 5/1995 | Herberle |
| 5,533,123 | A | 7/1996 | Force et al. |
| 6,108,751 | A | 8/2000 | Lee et al. |
| 6,115,424 | A | 9/2000 | Nakatsugawa et al. |
| 6,142,241 | A | 11/2000 | Finley |
| 6,384,640 | B1 | 5/2002 | Du Bois et al. |
| 6,477,140 | B1 | 11/2002 | Uda et al. |
| 7,596,699 | B2 | 9/2009 | Kwok |
| 7,667,429 | B2 | 2/2010 | Little |
| 7,673,080 | B1 | 3/2010 | Yu et al. |
| 8,014,831 | B2 | 9/2011 | Brown et al. |
| 8,677,145 | B2 | 3/2014 | Maletsky et al. |
| 2006/0059574 | A1 | 3/2006 | Fayad et al. |
| 2007/0226497 | A1 | 9/2007 | Taylor |
| 2009/0113220 | A1 | 4/2009 | Lee et al. |
| 2010/0223476 | A1 | 9/2010 | Maletsky et al. |

*Primary Examiner* — Mahfuzur Rahman
*Assistant Examiner* — John B King
(74) *Attorney, Agent, or Firm* — Fish & Richardson P.C.

(57) ABSTRACT

A method and device include a power pin, a ground pin, and a communications pin. A communications module receives power from the power pin and utilizes an edge counting communication protocol over the communication pin.

20 Claims, 5 Drawing Sheets

SINGLE PIN COMMUNICATION MECHANISM

This application is a continuation of U.S. application Ser. No. 12/395,449, filed Feb. 27, 2009, the entire disclosure of which is incorporated by reference.

BACKGROUND

Electrical contacts between an element and a host can be physically large, costly and unreliable. Some elements are consumable, replaceable or removable and it is desired that their cost be lower. One type of such element is a battery pack. It may have only three wires that provide power, ground, and communications. In many cases, it is advantageous to authenticate a battery pack using the communication pin to ensure that it was manufactured by a bona-fide supplier. Such authentication may help to ensure that the battery pack provides the requisite voltage and current for proper operation of the host. Communications via the communications wire should be reliable and fast.

Existing "one-wire" communication protocols are relatively slow and are susceptible to timing variations on the element side of communication transactions. Since data transfer is dependent on the width of pulses sent between the host and element, timing can be a very important to proper communication. Such elements typically do not include a crystal to provide precise timing information beneficial to pulse width coding based communication protocols.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software running on hardware. The software may consist of computer executable instructions stored on computer readable media such as memory or other type of storage devices. Further, such functions correspond to modules, which are software on storage devices, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
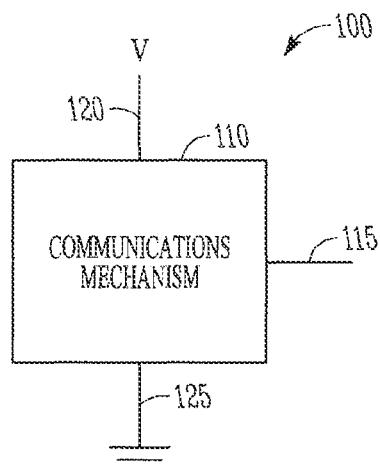
FIG. 1 is a block diagram of a single pin communication mechanism using pulse counting according to an example embodiment.

FIG. 1 is a block diagram 100 of a single pin communication mechanism 110 using pulse counting to encode information according to an example embodiment. Mechanism 110 includes a single pin 115 for communicating. Power is provided via a pin 120, with the mechanism 100 also having a ground pin 125. Mechanism 110 both receives and transmits information in a series of digital pulses, with logical ones and zeros represented by different numbers of such pulses. The pulses may be counted to determine a logical value for each bit serially transmitted via the pulses. In one embodiment, leading edges of pulses are counted. In further embodiments, trailing edges of pulses may be counted. The pulses may be formed of predetermined periods of high or low voltages levels in one embodiment. Mechanism 110 thus implements an edge counting communication protocol over the single pin 120. The communication functions performed by mechanism 110 may be included on one or more elements and one or more host devices coupled via a single communication line. In further embodiments, elements and hosts may have additional communication pins for coupling to other devices using either the edge counting communication protocol or other protocols if desired.

Figure 2:
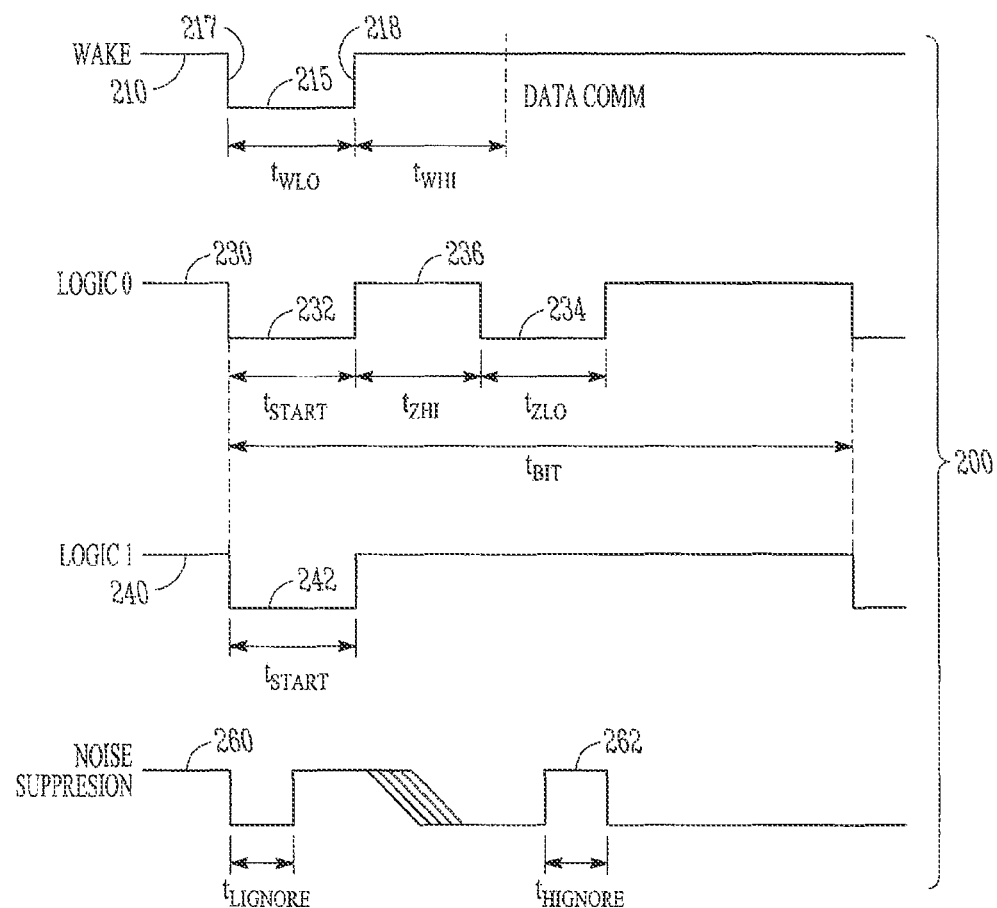
FIG. 2 is a timing diagram showing pulses on the single pin of the mechanism of FIG. 1.

FIG. 2 is a timing diagram 200 showing waveforms illustrating pulses on the single pin 115 of the mechanism 110 of FIG. 1. A first wavefom 1210 illustrates a wake pulse 215. The wake pulse 215 serves to wake the mechanism 110 from a lower power state, such as a sleep state. The wake pulse 215 has a leading edge 217 that begins a low pulse for a period, $t_W$. A trailing edge 218 ends the wake pulse. Following a period of time indicated at $t_{WHI}$, at 220, data communications may begin. In one embodiment, the period of time may be longer than the pulse width, but shorter than a time out, at which point, a further wake pulse may be used to wake the device. Either a host or the element coupled to the host via the single pin may initiate communications in this manner.

The device receiving the wake pulse is ready for pulses representative of logic values as indicated at waveforms 230 and 240, corresponding to logic zero value and logic one value respectively. Waveform 230 indicates the use of two low pulses 232 and 234 separated by a hi pulse 236. Low pulse 232 occurs for a period $t_{START}$, followed by the hi pulse 236 for a period, $t_{ZHI}$, and then low pulse 234 for a period $t_{ZLO}$. After a predetermined amount of time, further pulses may be received or sent indicative of a next bit of data. In one embodiment, a device need not receive a wake pulse in order to begin receiving pulses representative of data. The first bit pulse of data may be sufficient to enable the device to receive further bits, or retransmission may be requested if the first data is not properly received absent a wake token.

Waveform 240 indicates the use of a single pulse for a logic one. In one embodiment, the single pulse 242 has the same period $t_{START}$, as the first low pulses 232 for a logic zero. As with the logic zero, further pulses may be received or sent following the predetermined period.

In FIG. 2, the predetermined amount of time for transmission of a bit, either a logic one or logic zero includes the pulse or pulses, and is represented by $t_{BIT}$ 150. In one embodiment, the time following transmission of pulses representative of a logic value is longer than a low pulse, but shorter than a time out period. The length of the pulses and times between pulses may be selected as a function of the expected accuracy of timers in the devices, as well as the desired throughput. Throughput or bandwidth of the devices may be improved by increasing the accuracy of timers. However, good performance may be obtained without the need for highly accurate timers.

A noise suppression waveform 260 illustrates different noise that may occur. Voltage transitions may appear to be similar to pulses used to wake and transfer bits. However, they likely will have period, $t_{LIGNORE}$, less than the width of a valid pulse. Similarly, a high spike in voltage may also occur for short periods that should be ignored as illustrated at 262.

In one embodiment, communications conform to an overall hierarchical structure. Tokens refer to single data bits, such as the wake up pulse, and the logic zero and logic one pulses. Other communications structures may be used in further embodiments, and the following is just one example structure.

Flags are comprised of eight tokens or bits, which convey the direction and meaning of the next group of bits if any, which may be transmitted. In one embodiment, the host is always a bus master. Before any I/O transaction, the host sends an 8 bit flag to a device to indicate an I/O operation that is to be performed. Different flags include a command flag that is followed by sending a command block to the device. The first bit of the command block may follow immediately after the last bit of the command flag. A transmit flag may be used after a turn-around delay. The device may start transmitting the response for a previously transmitted command block. A sleep flag results in the device entering a low power mode until a next wake token is received.

After a command flag is transmitted, a command block may be sent to the device. During parsing of parameters of a command and subsequent execution of a properly received command, the device may be busy and not respond to transitions on the pin 115. Some delays may include a parsing delay to allow checking of cyclic redundancy code (CRC) and parsing of an opcode and parameters before an error indication will be available. A memory delay is the delay to execute read, write or lock commands. A fuse delay is a delay for executing a fuse blow command. A media access control (MAC) delay is a delay to execute a MAC command related to cryptographic operations. A personalize delay corresponds to a delay to execute a load personalization or decryption described below.

The transmit flag may be used to turn around on the signal to that data can be sent back to the host, depending on its current state. After wake, but prior to the first command, the state of the device indicates that a proper wake token has been received. After a successful command execution, a byte or bytes may be returned indicating success. After a CRC or other parsing error, the command was not properly received and should be reissued by the host. If a write was requested, it was not attempted.

The sleep flag is used to transition the device to a low power state, which causes a complete reset of internal components in the device. A sleep flag can be sent at any time by the host. In one embodiment, the host calculates a total time required for all commands to be sent to the device during a single session, including inter-bit/byte delays. If this total exceeds an amount of time, referred to as t WATCHDOG, then the host issues a partial set of commands, then a sleep flag, then a wake token, and then the remaining commands.

I/O blocks may be sent by devices in response to commands. Blocks may be constructed in one embodiment by indicating the number of bytes to be transferred in byte zero, including the count value itself. In one embodiment, blocks may have between 4 and 39 bytes. Values, N, outside this range may cause unpredictable operation. N may be larger or smaller in various embodiments. Bytes 1 to N-2 are referred to as a packet, and may contain a command, parameters and data, or a response. The last two bytes of a block comprise a checksum in one embodiment. The checksum may be a CRC-16 verification of the block.

A typical I/O flow may include the following sequence of communications via the pin 115:
1. Host sends wake token.
2. Host sends transmit flag.
3. Receive 0×11 value from device to verify proper wakeup synchronization.
4. Host sends command flag.
5. Host sends command block.
6. Host waits $t_{PARSE}$ for device to check for command formation errors.
7. Host sends transmit flag. If command format is OK, device ignores the flag because the computations are being performed. If there was an error, the device responds with the error code.
8. Host waits $t_{EXEC}$.
9. Host sends transmit flag.
10. Receive output block from device, host checks CRC.
11. If CRC is incorrect, transmission error is indicated and the host resends the transmit flag.
12. Host sends sleep flag to device.

In one embodiment, commands other than an MAC command have a short execution delay. The host may replace communications in 6, 7, and 8 with a wait duration of $t_{PARSE} + t_{EXEC}$.

If the host and device fall out of synchronization, the device may implement a time out that forces it to enter a sleep mode. For instance, after a leading edge transition for any data token that has been received, the device will expect another token to be transmitted within a $t_{TIMEOUT}$ interval. If the leading edge of the next token is not received within this time period, the device assumes that synchronization is lost and transitions to a sleep state.

After the device receives the last bit of a command block, the timeout functionality is disabled. If the command is properly formatted, the timeout functionality is re-enabled with the first transmit token that occurs after $t_{PARSE} + t_{EXEC}$. If there was an error in the command, then the timeout functionality is re-enabled with the first transmit token that occurs after $t_{PARSE}$.

When the device and host fall out of synchronization, the host will ultimately end up sending a transmit flag which will not generate a response from the device. The host may implement a timeout during which the device would normally go into sleep mode and then send a wait token, followed by a transmit token after waiting $t_{WLO} + t_{WHI}$. Other conditions may also cause a falling out of synchronization. Leaving the pin 115 idle for $t_{TIMEOUT}$ should cause the device to enter sleep mode. The device may then be sent a wake token to re-establish synchronization.

After a wake token has been received by the device, a watchdog counter is started within the device in one embodiment. After a time, $t_{WATCHDOG}$, the device will enter a sleep mode regardless of whether it is in the middle of execution of a command or I/O transmission. There is no way to reset the counter in one embodiment other than putting the device to sleep and receiving a wake up token. The watchdog counter acts as a power conserving fail-safe for battery operated devices so that no matter what happens on either the host or inside various components, such as state machines in the device, including any I/O synchronization issues, power consumption will automatically fall to a low standby level. The watchdog counter is one reason that the host will calculate the total time required for operations and divide an operation into two or more portions, placing the device in sleep mode and waking it up between the portions.

Figure 3:
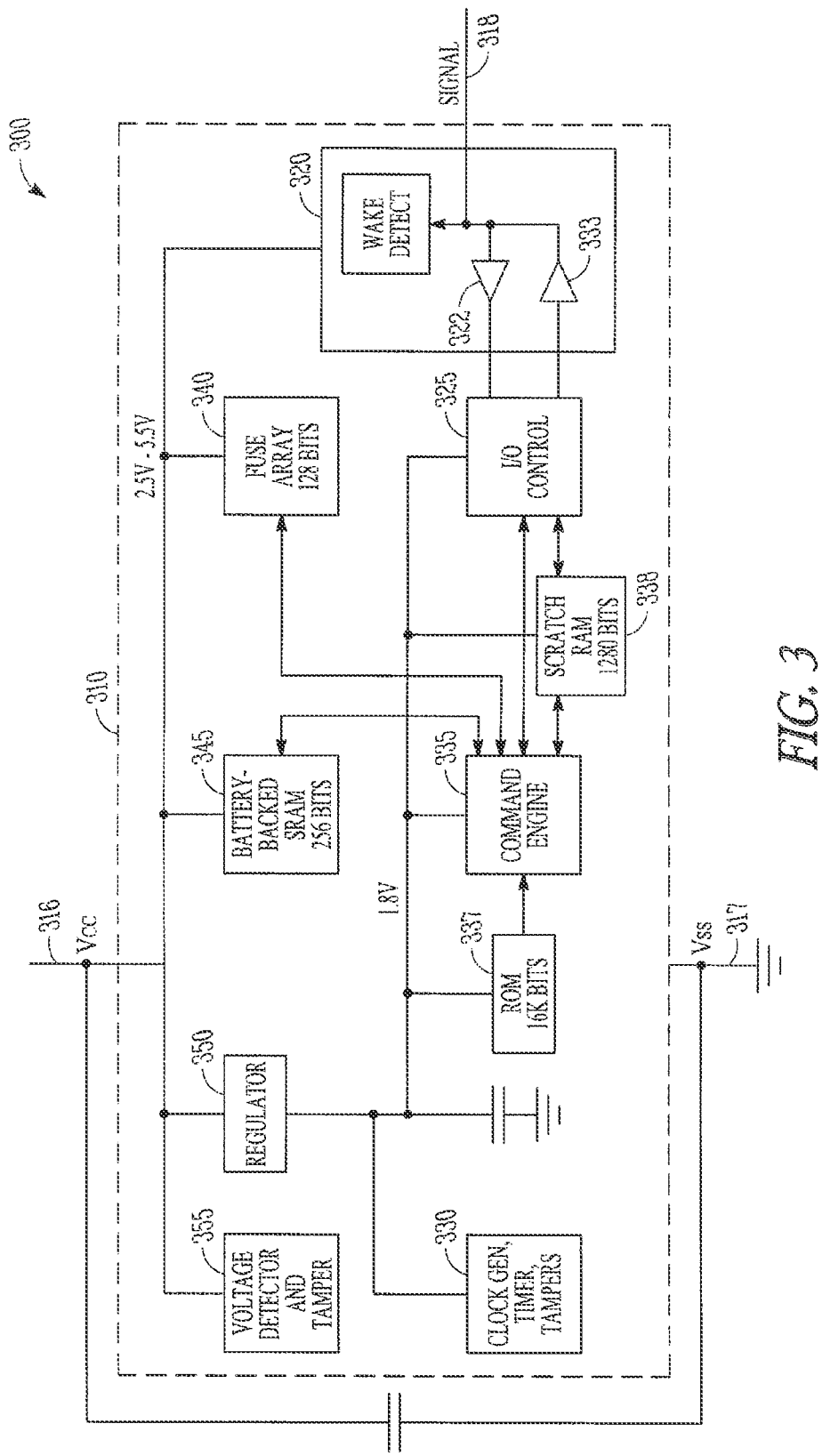
FIG. 3 is a block diagram illustrating details of a communication mechanism using pulse counting according to an example embodiment.

FIG. 3 is a block diagram illustrating details of a communication mechanism 300 using pulse counting according to an example embodiment. Communication mechanism 300 comprises a multiple module electronics chip 310 having three pins, a Vcc pin 316, Vss pin 317 and communications pin 318. Selected modules may be state machines or other components in various embodiments. Many other configurations of modules and components may be used, and the functions performed may be implemented in one or more of the modules or components. The embodiment described in FIG. 3 is just one example arrangement of modules and components, and the functions they perform.

In one embodiment chip 310 includes a wake detect module 320 coupled to the communications pin 318. Wake detect module 320 responds to a wake pulse, detecting that another device desires to establish communications, and provides signals to other modules regarding a wake signal being received. Wake detect module 320 may both receive and transmit pulse count coded data as illustrated by diodes 322, 323.

Wake detect module 320 is coupled to an I/O control module 325. In one embodiment, I/O control module encodes and decodes pulses to and from logical values representative of bits and bytes to be communicated. A clock generator 330 provides timing information to the I/O control module 325 to facilitate such encoding and decoding.

I/O control module 325 is coupled to a command engine 335, which receives decoded signals from I/O control 325. Command engine 330 executes programming from a read only memory (ROM) 337, and also may utilize a scratch random access memory (RAM) 338 to exchange data with I/O control 325. In further embodiments, command engine 330 may execute code from a variety of different memory devices, such as ROM, EEPROM or FLASH. In one embodiment, command engine 335 is coupled to a fuse array 340, which may contain information such as a unique serial number regarding the chip 310, or a device coupled to the chip. In addition, or as an alternative, any type of nonvolatile memory may be used, including battery-backed SRAM, ROM, EEPROM, BBSRAM, FLASH, etc. In one embodiment, the fuse array 340 may be read and written via pin 318. The first 8 bits are lock bits that control the ability to burn 16 bit words of the array. The next 8 bits may be programmed by a manufacturer with a serial number that is guaranteed to be unique, including such things as lot/wafer information. The serial number may be locked at shipment. The number of bits used for different functions may vary in different embodiments. Other nonvolatile memory devices may also have data locking mechanisms to prevent modification of data such as secrets.

Command engine 335 may also be coupled to a battery backed static random access memory (SRAM) 345, or any other type of nonvolatile memory, which in one embodiment may contain a secret, such as a secret key to provide security for the unique serial number. A secret may be any type of information to be protected from discovery. In one embodiment, SRAM 345 has 256 bit capacity, can be read, written, and locked. The memory will retain its value when the chip 310 is put or goes to sleep so long as a supply voltage in excess of a retain voltage is provided to the chip 310. In one embodiment, the command engine 335 performs a cryptographic calculation, a keyed digest of an input challenge received via pin 318. In one embodiment, the calculation is based on a SHA-256 digest or an AES algorithm. A customer identification may also be stored, such as in ROM 337, and included in the calculation.

Further elements in the chip 310 may include a regulator 350 for regulating voltage for the other components of the chip 310. A voltage detector and tamper module 355 may be used to detect potential tampering with the chip, such as attempts to defeat the key and obtain the secure information from the chip 310. Generation of clock and supply signals internal to chip 310 helps prevent direct attack via the chip external pins on the clock and supply signals.

Figure 4:
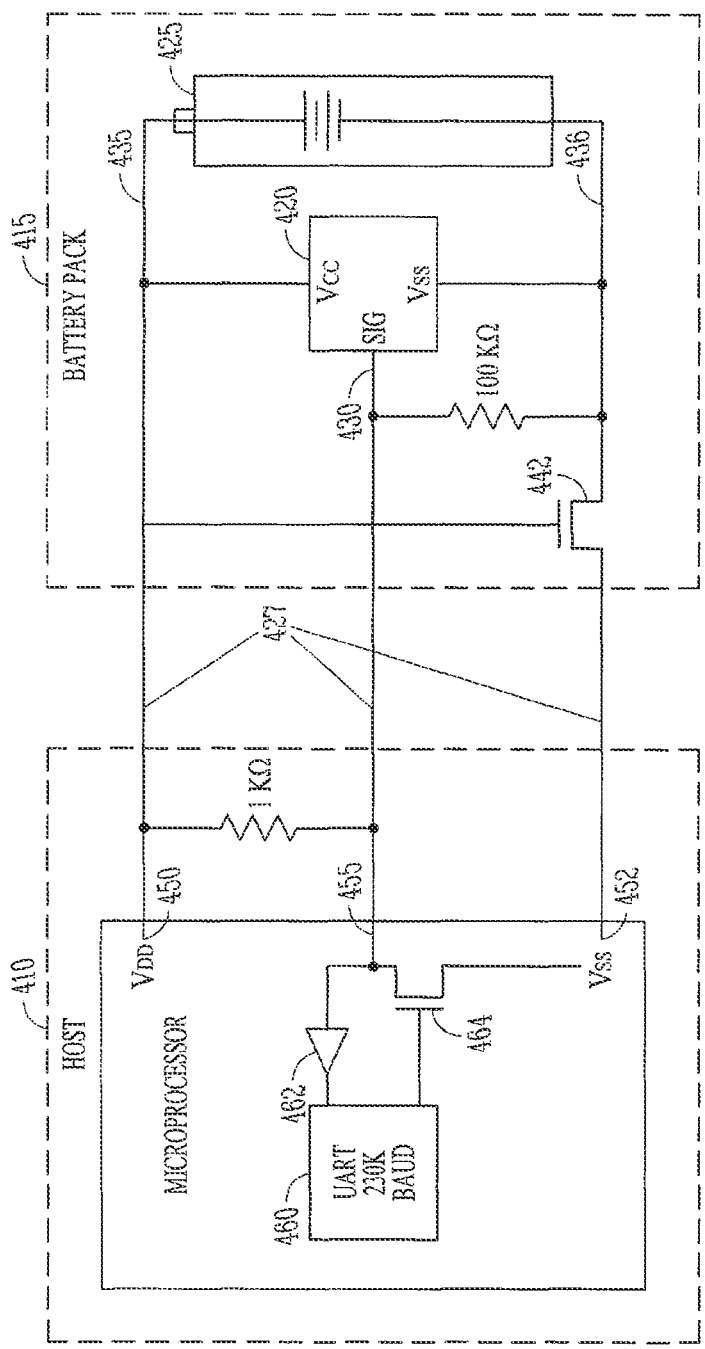
FIG. 4 is a block diagram illustrating implementation of a pulse counting communication mechanism to communicate between a host and a battery pack according to an example embodiment.

FIG. 4 is a block diagram illustrating implementation of a pulse counting communication mechanism to communicate between a host 410 and a battery pack 415 according to an example embodiment. In one embodiment, a communications chip 420 is coupled to a battery 425 in battery pack 415 in an integrated manner, such that the battery pack 415 may be plugged into the host 410 via mating connectors 427. Communications chip 420 implements that edge counting communication protocol described above, and has a single communications pin 430. Battery 425 in one embodiment comprises a rechargeable battery, such as Lithium ion cells, and provides power to chip 420 as indicated at lines 435,436, corresponding to Vcc and Vss respectively. In one embodiment, a high impedance 440 is coupled between the communications pin 430 and Vss 436 to ensure the signal pin is held at a low level when the battery pack is removed and there is no other driver on the communications pin 430. In other words, this resistor prevents the input from floating to an unacceptable level. A protection transistor 442, such as a field effect transistor (FET) is coupled in line with Vss 436 to an output connector of the battery pack 415, having a gate coupled to Vcc 435. The protection transistor 442 prevents high current surges on Vss 436.

Host 410 has a $V_{DD}$ 450 coupled to line 435, Vss 452 coupled to Vss 436 and a corresponding communications line 455 coupled to pin 430 for receiving and sending communications with chip 420. Line 455 is coupled to a universal asynchronous receiver/transmitter (UART) 460 via an input buffer 462, transistor 464 and connection to ground that provide proper protection for UART 460. Transistor 464 in one embodiment is an output FET or transistor, connected in an open-drain or open-collector configuration. Input buffer 462 and transistor 464 are I/O circuitry for the UART 460 to translate external voltages to levels appropriate for the internal circuitry in the UART and provide the appropriate high current drive capability for the output. Further, an impedance 470 is coupled between $V_{DD}$ 450 and communications line 455. In one embodiment, the battery 425 may provide power to the host, or be recharged by the host if the host is coupled to another power source.

Host 410, as indicated above, servers as a master in communications with chip 420. Chip 420 provides authentication of the battery pack 415 to host 410 utilizing the edge counting communication protocol described above in one embodiment. In further embodiments, other commands may be implemented using the same communication protocol. A battery pack is just one example of a device that may be coupled to a host and use the edge counting communication protocol. Many other types of devices may be coupled in a similar manner.

Figure 5:
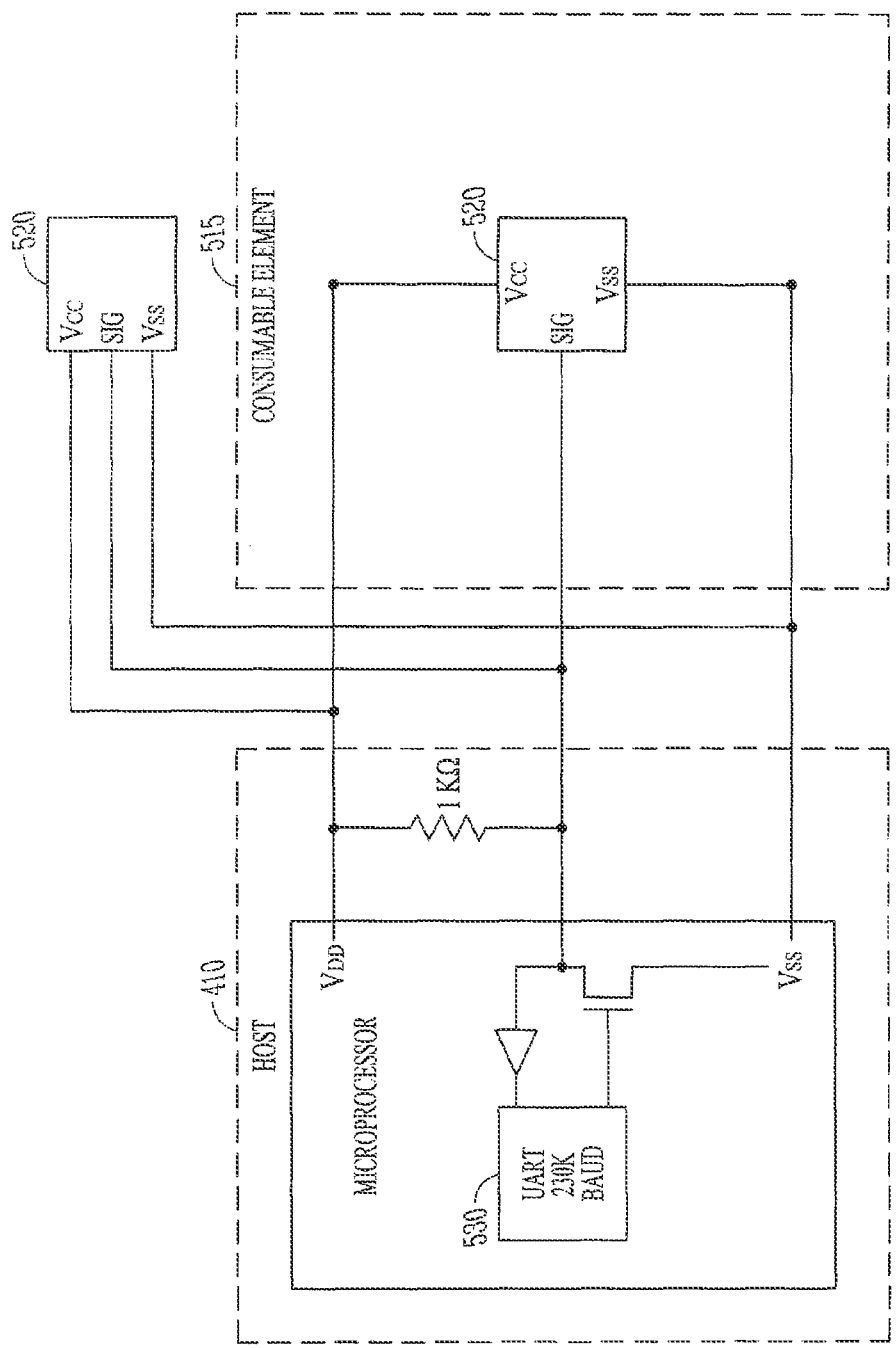
FIG. 5 is a block diagram illustrating implementation of a pulse counting communication mechanism to communicate between a host and a consumable element according to an example embodiment.

FIG. 5 is a block diagram illustrating implementation of a pulse counting communication mechanism to communicate between a host 510 and a consumable element 515 according to an example embodiment. In one embodiment, a communications module or component 520 implements the edge counting communication protocol described above, and communicates over a single pin coupled to a UART 530, which may be implemented in a similar manner, or may include many different hardware and hardware/software implementations in various embodiments. Consumable element 515 may be many different things, such as battery packs, limited use medical, temperature, pressure, flow, or other types of sensors, printer cartridges, lights, or other devices that may benefit from the ability to communicate with a host via a simple, low cost communication mechanism. A second consumable element 520 is also shown coupled via the same three pins. The consumable elements may both respond to the same commands, or the commands may be addressed to a specific consumable element.

In one embodiment, multiple elements may be coupled to a wire of a bus, and utilize a single pin for communications. An address may be stored in each element. Elements may transmit their address, and receive their address. Elements receiving their address will communicate on the bus, while other elements remain silent until their address is received.

Figure 6:
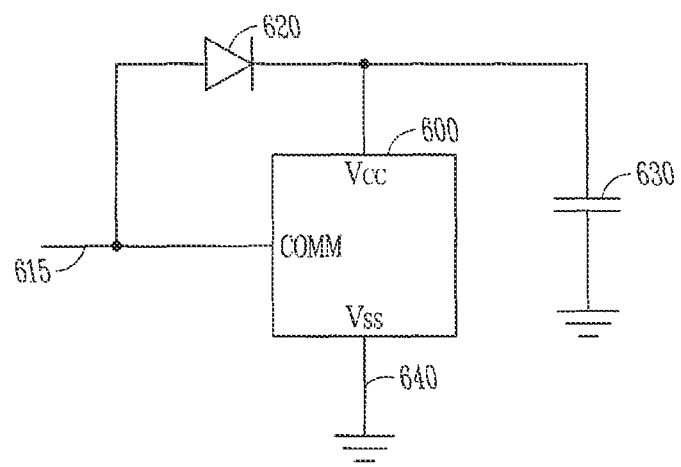
FIG. 6 is a block diagram of an alternative single pin communication mechanism using pulse counting according to an example embodiment.

FIG. 6 is a block diagram of an alternative single pin communication mechanism 600 using pulse counting according to an example embodiment. Mechanism 600 includes a single pin 615 for communicating. Power is provided via communication pin 615 on a connector to a battery pack or ink cartridge or other device. A diode 620 and capacitor 630 to obtain power from the communications pin 615. In some embodiments, the diode 620 and (under some circumstances) the capacitor 630 are used on a chip such that the chip only has two pins, the communication pin 615 and a ground pin 640.

Mechanism 600 both receives and transmits information in a series of digital pulses, with logical ones and zeros represented by different numbers of such pulses. The pulses may be counted to determine a logical value for each bit serially transmitted via the pulses. In one embodiment, leading edges of pulses are counted. In further embodiments, trailing edges of pulses may be counted. The pulses may be formed of predetermined periods of high or low voltages levels in one embodiment. Mechanism 600 thus implements an edge counting communication protocol over the single pin 615. The communication functions performed by mechanism 600 may be included on one or more elements and one or more host devices coupled via a single communication line. In further embodiments, elements and hosts may have additional communication pins for coupling to other devices using either the edge counting communication protocol or other protocols if desired.

The Abstract is provided to comply with 37C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A consumable module comprising:
   a consumable element; and
   a communication chip coupled to the consumable element, the communication chip including:
      a communication pin to couple the communication chip to another device to exchange data;
      a first communication module coupled to the communication pin, and to detect and count pulses serially received or transmitted on the communication pin corresponding to a wake token, a zero token and a one token, wherein the zero token comprises a first low pulse occurring for a start period, followed by a first high pulse occurring for a high period, followed by a second low pulse occurring for a low period, and wherein the one token comprises the second low pulse followed by a second high pulse that is sent after the start period, and wherein the first communication module uses pulse counts to transfer data;
      a memory containing secret data and a serial number of the consumable module; and
      a first command circuit to perform cryptographic calculations utilizing the secret data to authenticate the consumable module, wherein the first command circuit is coupled to the first communication module to receive commands and provide data responsive to such commands; and
      a second circuit to assemble the zero tokens and the one tokens into one or more bytes for providing responses verifying proper command executions, including one of cryptographically calculated data based on the secret data, cryptographically calculated data based on a received digest, or cryptographically calculated data based on a customer identification data.

2. The consumable module of claim 1, further comprising a protected nonvolatile memory containing the secret data.

3. The consumable module of claim 1, wherein the first command circuit enters into a sleep state if the first command circuit detects a leading edge transition and does not receive a token after a timeout interval.

4. The consumable module of claim 1, wherein the first communication module utilizes a single communication channel to communicate.

5. The consumable module of claim 1, wherein the communication pin is coupled to a communication line coupled to a host.

6. The consumable module of claim 1, wherein the first communication module functions to receive the wake token, the zero token and the one token.

7. The consumable module of claim 1, wherein bits are formed by one or more transitions from a high voltage level to a low voltage level or from a low voltage level to a high voltage level.

8. The consumable module of claim 1, wherein the wake token comprises a pulse having a leading edge or trailing edge transitioning from a high voltage level to a low voltage level or from a low voltage level to a high voltage level.

9. The consumable module of claim 1 and further comprising a power pin to receive power.

10. The consumable module of claim 1, wherein the consumable module is configured for receiving power from the communication pin.

11. The consumable module of claim 1, wherein the communication chip further comprises a wake module that receives the wake tokens that initiate waking up the communication chip and enables the first communication module to receive the zero tokens and the one tokens.

12. The consumable module of claim 1, wherein the communication chip further comprises a watchdog counter operable to place the communication chip into a sleep mode.

13. The consumable module of claim 1, wherein the communication chip assembles the bytes of data into blocks of data including a CRC for the block.

14. The consumable module of claim 1, wherein the consumable element is one of
- a printer cartridge,
- a temperature sensor,
- a pressure sensor,
- a flow sensor,
- a light, or
- a battery.

15. The consumable module of claim 1, further including two or more consumable elements coupled to the communication chip.

16. The consumable module of claim 1, wherein the communication pin is coupled to one or more devices to exchange data.

17. A module comprising:
- an element; and
- a communication chip coupled to the element, the communication chip including:
  - a communication pin to couple the communication chip to another device to exchange data;
  - a first communication module coupled to the communication pin, and to detect and count pulses serially received or transmitted on the communication pin corresponding to a wake token, a zero token and a one token, wherein the zero token comprises a first low pulse occurring for a start period, followed by a first high pulse occurring for a high period, followed by a second low pulse occurring for a low period, and wherein the one token comprises the second low pulse followed by a second high pulse that is sent after the start period, and wherein the first communication module uses pulse counts to transfer data;
  - a memory containing secret data and a serial number of the module ; and
  - a first command circuit to perform cryptographic calculations utilizing the secret data to authenticate the module , wherein the first command circuit is coupled to the first communication module to receive commands and provide data responsive to such commands; and
  - a second circuit to assemble the zero tokens and the one tokens into one or more bytes for providing responses verifying proper command executions, including one of cryptographically calculated data based on the secret data, cryptographically calculated data based on a received digest, or cryptographically calculated data based on a customer identification data.

18. The module of claim 17, wherein the element is replaceable or removable.

19. The module of claim 17, wherein the first communication module utilizes a single communication channel to communicate.

20. The module of claim 17, further including two or more elements coupled to the communication chip.

\* \* \* \* \*

UNITED STATES PATENT AND TRADEMARK OFFICE
CERTIFICATE OF CORRECTION

PATENT NO. : 9,182,802 B2  
APPLICATION NO. : 14/060466  
DATED : November 10, 2015  
INVENTOR(S) : Kerry David Maletsky et al.

Page 1 of 1

It is certified that error appears in the above-identified patent and that said Letters Patent is hereby corrected as shown below:

Specification

Column 2, Line 38; Delete "wavefom" and insert -- waveform --, therefor.

Column 3, Line 53; Delete "to" and insert -- so --, therefor.

Column 3, Line 67; Delete "t WATCHDOG," and insert -- $t_{WATCHDOG},$ --, therefor.

Column 6, Line 61; Delete "servers" and insert -- serves --, therefor.

Column 7, Line 56; Delete "37C.F.R." and insert -- 37 C.F.R. --, therefor.

Claims

Column 10, Line 6; In Claim 17, delete "module ;" and insert -- module; --, therefor.

Column 10, Line 9; In Claim 17, delete "module ," and insert -- module, --, therefor.

Signed and Sealed this  
Twenty-third Day of February, 2016

Michelle K. Lee  
*Director of the United States Patent and Trademark Office*